June 8, 1937.   S. H. CHAMPLIN   2,083,293
VEGETABLE STEAMER
Filed Feb. 20, 1934
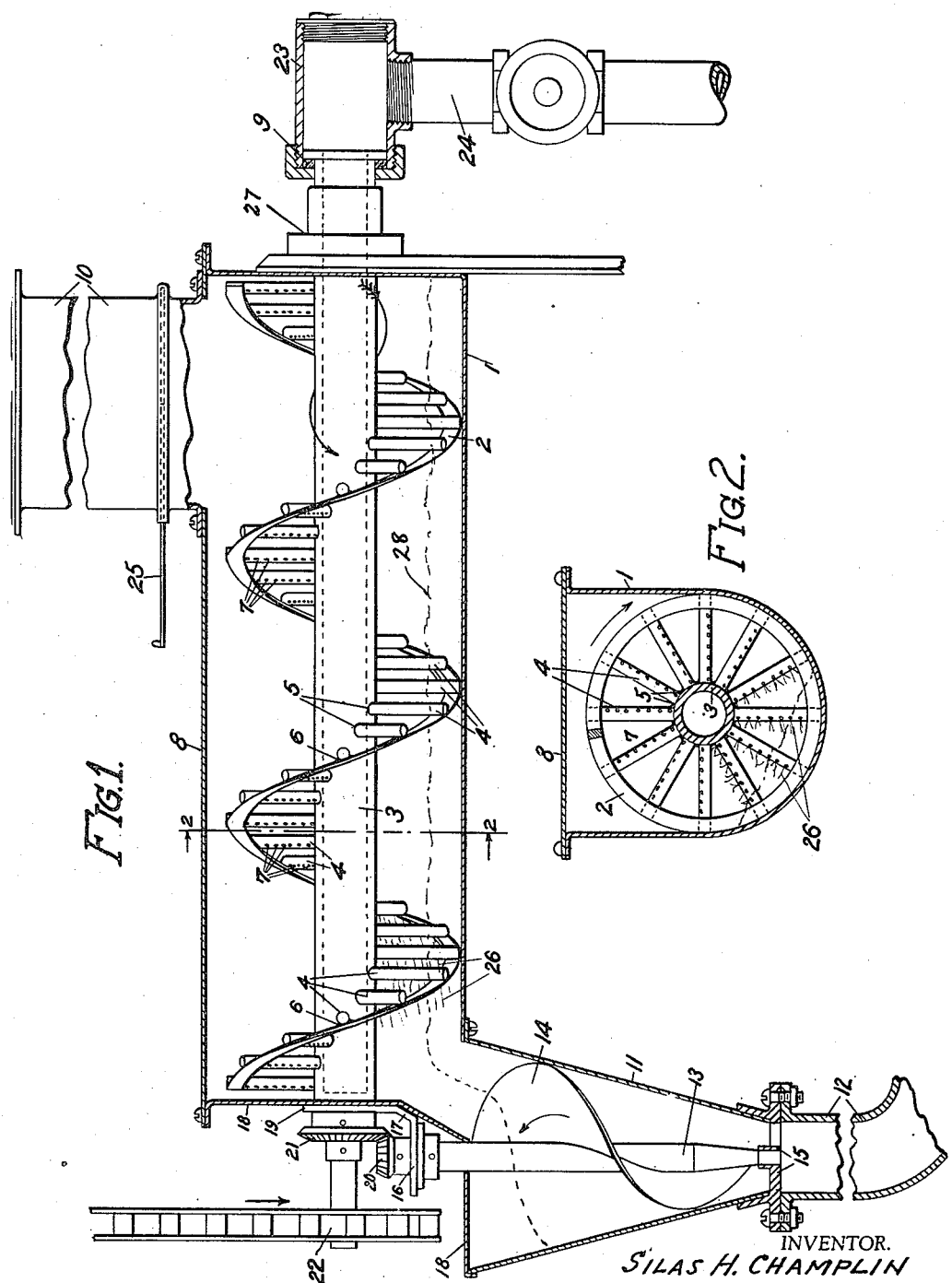
INVENTOR.
SILAS H. CHAMPLIN
BY Miller Boyken & Bried
ATTORNEYS.

Patented June 8, 1937

2,083,293

UNITED STATES PATENT OFFICE 2,083,293

VEGETABLE STEAMER

Silas H. Champlin, San Leandro, Calif., assignor to The Nielsen Corporation, Ltd., Oakland, Calif., a corporation of California Application February 20, 1934, Serial No. 712,134

2 Claims. (Cl. 53—18)

This invention relates to apparatus for steaming food products in preparing the same for canning, and the objects of the invention are to provide improvements in the construction of such apparatus whereby ground or finely chopped raw vegetables or fruits may be very quickly steamed or pre-cooked.

In the accompanying drawing the preferred construction of my apparatus is shown, Fig. 1 being a longitudinal section of the same, and Fig. 2 a cross section taken along the line 2—2 of Fig. 1.

Briefly described the apparatus comprises a steam-heated spiral conveyor of unique construction adapting it more particularly to the use mentioned.

In the drawing 1 is the metal casing of a spiral conveyor 2 and which latter takes the form of a narrow ribbon flight spaced concentrically around a hollow pipe shaft 3 by means of numerous small pipe arms 4 threaded into the hollow shaft and also welded thereto as at 5. These small pipes are closed at their outer ends and welded to the rear side of the ribbon flight as at 6, and each small pipe perforated with a row of fine holes 7 directed forwardly at about 45° to the longitudinal axis of the conveyor.

The casing 1 is curved at the bottom so as to just clear the conveyor, and with vertical side walls flanged outwardly and closed by a flat cover plate 8 secured as by bolts or otherwise to the flange as indicated.

The feed end of the conveyor is closed and supports a bearing 27 and stuffing box 9 through which the hollow shaft passes, while above this end of the conveyor casing is a feeding chute 10 through which material 28 is fed to the conveyor for steaming.

The opposite end of the conveyor casing discharges into a vertically disposed funnel-shaped chute 11 which terminates in a laterally curved discharge pipe 12, while within the funnel is a vertical shaft 13 secured to which is a spiral metal blade 14 fitting nicely within the funnel so as to force downward and concentrate any material into and out of the discharge pipe 12 when the shaft 13 is turned. This shaft is supported in a lower step bearing indicated at 15 and above the funnel by a bearing at 16 carried by a bracket 17 supported by a closure plate 18 which covers the discharge end of the conveyor casing as well as the upper end of the funnel.

Bracket 17 also supports a bearing 19 for the conveyor shaft, and the two shafts are geared together by bevel gears 20, 21, while shaft 3 is closed at its outer end fitted with a driving sprocket or gear 22.

The opposite end of the hollow shaft is provided with a suitable packing or slip joint 23 and connected to a steam supply pipe 24 for admission of steam while permitting free turning of the conveyor shaft as well understood in such constructions.

In use the material to be treated, such as finely chopped or ground raw vegetables, from chute 10 controlled as by gate 25, is fed into the conveyor where it is at once screwed along while being continually lifted and dropped by the many small pipe arms 4 which are spaced so close together as to virtually form a spiral flight or rake, yet permit the material to fall through between them. While the material is being advanced by the conveyor the angularly directed steam jets 26 both lift and loosen up the material and also urge it forward at the same time cook it to a soft condition. As the steam admitted may be very hot the required cooking is obtained in a few seconds of travel through the conveyor. The steamed material then passes into the upper end of spiral feeder 11 which compacts it and forces it out with considerable pressure from discharge pipe 12 and into a colloid mill not shown for further reduction and canning.

I am aware of the prior use of steaming and cooking spiral conveyors in the art of treating various materials, but believe the combination of advantageous features above described to be new and of particular value in the treating of vegetables and fruits in the making of canned pap for the feeding of babies, and I therefore claim:

1. Apparatus for steaming food materials comprising a spiral conveyor operating in a closed casing arranged to receive material at one end and discharge at the other, said conveyor provided with a hollow drive shaft, a ribbon spiral conveyor flight secured to the shaft by means of a plurality of radially extending small pipes opening to the bore of the shaft, said ribbon flight being carried at the outer ends of the small pipes spaced from the hollow shaft and said small pipes closed on their outer ends and perforated with small holes arranged at an angle adapted to emit steam to impinge the material being conveyed, and urge the same forward in direction of travel of the material, and means for admitting steam to said hollow drive shaft.

2. Apparatus for steaming food materials comprising a spiral conveyor operating in a closed casing arranged to receive material at one end and discharge at the other, said conveyor provided with a hollow drive shaft, a ribbon spiral conveyor flight secured to the shaft by means of a plurality of radially extending small pipes opening to the bore of the shaft, said ribbon flight being carried at the outer ends of the small pipes spaced from the hollow shaft and said small pipes closed on their outer ends and perforated with small holes arranged at an angle adapted to emit steam to impinge the material being conveyed and urge the same forward in direction of travel of the material, and means for admitting steam to said hollow drive shaft, said small pipes spaced slightly apart and extending along the shaft to form substantially a spiral flight and carrying said ribbon flight at their outer ends.

SILAS H. CHAMPLIN.